Oct. 5, 1926.

A. F. WELCH 1,601,934

ROTATABLE ELECTRICAL APPARATUS

Filed Oct. 23, 1922

Inventor:
Alfred F. Welch,
by *Alexander F. Lunt*
His Attorney.

Patented Oct. 5, 1926.

1,601,934

UNITED STATES PATENT OFFICE.

ALFRED F. WELCH, OF FORT WAYNE, INDIANA, ASSIGNOR TO GENERAL ELECTRIC COMPANY, A CORPORATION OF NEW YORK.

ROTATABLE ELECTRICAL APPARATUS.

Application filed October 23, 1922. Serial No. 596,181.

My invention relates to rotatable electric apparatus.

Conditions often arise wherein it is desirable that a piece of machinery shall be in continual operation, even though the source of power driving the machinery fails due to some abnormal condition. Attempts have been made heretofore to accomplish this result by means of two electric motors, both mechanically connected to the machinery, one supplied from one source of current, and the other supplied from another source, with a centrifugal switch arranged to connect the second motor to the second source upon the failure of the first source. Such an arrangement has the disadvantage, however, that before the centrifugal switch can operate, the motor and machinery must slow down to a considerable extent.

My invention has for its object a novel arrangement for accomplishing this result without having the rotatable electrical apparatus or the machinery driven thereby slow down any appreciable amount. To this end, my invention consists in certain novel arrangements and combinations of parts which will be particularly set forth in the claims annexed to and forming a part of this specification.

Figure 1:
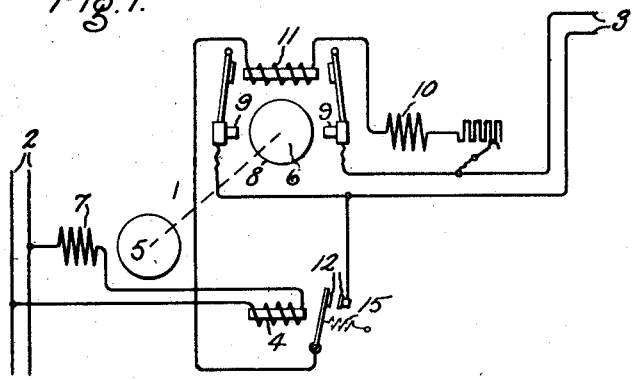
Figure 2:
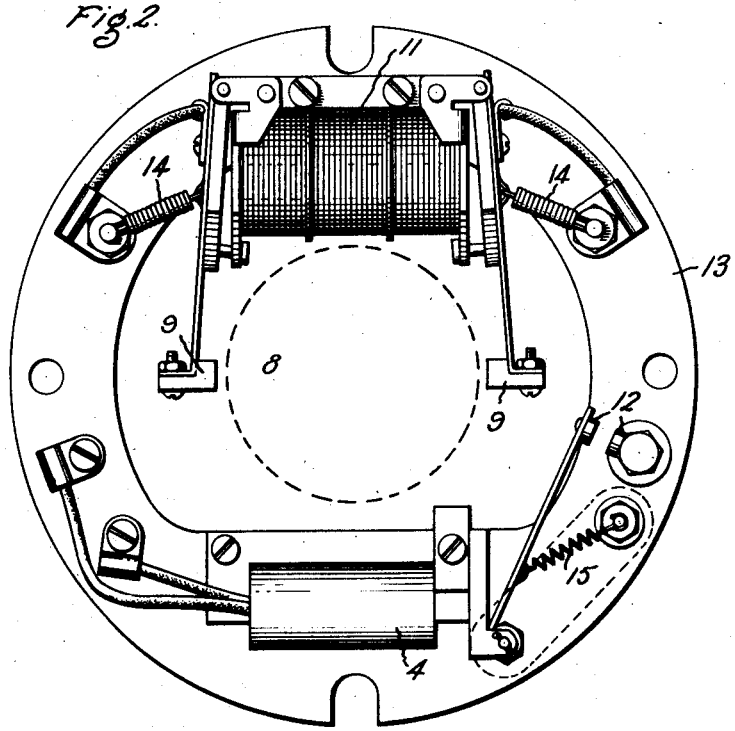

For a better understanding of my invention, reference may be had to the following description taken in connection with the accompanying drawing, in which Fig. 1 is a diagram embodying my invention, and Fig. 2 shows the detail construction of a portion of my novel arrangement.

Referring to the drawing, 1 is a rotatable electrical apparatus adapted to drive a piece of machinery (not shown). 2 is a source of current and 3 is a second source of current, to either of which the electrical apparatus 1 is adapted to be connected. Electrically controlled means 4, which I have shown as a relay, is responsive to conditions in one of said sources, say for instance source 2, and is connected so as to transfer the rotatable electrical apparatus 1 from one of the sources to the other, as from source 2 to source 3, upon the occurrence of abnormal conditions in the first source. The relay 4 operates to connect the rotatable electrical apparatus 1 to the source 3 if for any reason the current fails in the source 2, immediately upon the failure of such source and without any perceptible slowing down of the apparatus.

The electrical apparatus 1 preferably comprises two electric motors 5 and 6 mechanically connected together, the motor 5 being adapted to be connected to source 2 which may be an alternating current source, and the motor 6 being adapted to be connected to the source 3, which may be a direct current source, such as a storage battery. The motor 5 is shown as a single-phase alternating current motor of the induction type, the relay 4 being connected in circuit with the primary 7 of said motor. This motor may, however, be of any well known type. The motor 6 is shown as being of the direct current type having a commutator 8, brushes 9 and a field winding 10. This motor may also be of any well known type. The brushes 9 are normally out of contact with the commutator 8, and I provide an electroresponsive means 11 in the form of a magnet for bringing them into contact with the commutator. This means 11 is energized upon the occurrence of abnormal conditions in the source 2 by the relay 4. The field winding 10 is connected in series with the magnet 11, so that both the armature and the field of motor 6 are energized when the magnet 11 is energized.

The magnet 11 and the relay 4 together with the contacts 12 of the relay are mounted on a plate 13 which acts as a brush-holder yoke and is fastened to the motor. The brushes 9 are normally held out of contact with the commutator 8 by the springs 14. The contacts 12 are separated when the relay 4 is energized and upon deenergization of the relay, the contacts 12 are brought together by a spring 15.

My apparatus operates as follows: The motor 5 is connected to the source 2 and rotates the armature of motor 6 and the machinery to which they are connected, as for instance, machine switching panels for automatic telephones. The relay 4 being connected in series with the primary 7 of motor 5 is energized and holds the contacts 12 separated, and thus the circuits of motor 6 are maintained open. If, however, abnormal conditions obtain in the source 2, such as the failure of this source, the relay 4 is deenergized and closes the contacts 12, thereby completing the circuit of the field 10 as well as the magnet 11. The energization of the magnet 11 brings the brushes 9 into contact with the commutator 10 of the motor 6 and thus the armature and field of motor 6 are connected to source 3, whereupon motor 6 continues to drive the machinery to which it is connected, without any slowing up thereof. When the source 2 is restored, the relay 4 is again energized, disconnecting motor 6 from source 3, whereupon motor 5 again drives the machinery.

I desire it to be understood that my invention is not limited to the particular arrangement shown and described, and I aim in the appended claims to cover all modifications which do not depart from the spirit and scope of my invention.

What I claim as new and desire to secure by Letters Patent of the United States, is:

1. In combination, a source of current, a motor adapted to be connected thereto, a second source of current, a second motor adapted to be connected to said second source of current, said motors being mechanically connected together, said second motor having a field winding, a commutator and brushes, said brushes being normally out of contact with said commutator, electroresponsive means for bringing them into contact with said commutator, said electroresponsive means and said field winding being connected in series and being energized upon the occurrence of abnormal conditions in said first source.

2. In combination, a source of current, a motor adapted to be connected thereto, a second source of current, a second motor adapted to be connected to said second source of current, said motors being mechanically connected together, said second motor having a field winding, a commutator and brushes, said brushes being normally out of contact with said commutator, electroresponsive means for bringing them into contact with said commutator, said electroresponsive means and said field winding being connected in series, and a relay controlling said electroresponsive means and said field winding to energize said electroresponsive means to bring said brushes in contact with said commutator and to energize said field winding upon the occurrence of abnormal conditions in said first source.

3. In a motor control system, a motor comprising two electrically independent rotors mechanically connected, electrically independent fields cooperating with each of said rotors, a separate source of current for supplying each of said rotors and associated fields, and a relay in series with one field and one source of current, said relay when energized closing a circuit connecting said latter source of current with the rotor associated with said latter field.

4. In a motor control system, a motor comprising two electrically independent rotors mechanically connected, electrically independent fields cooperating with each of said rotors, a separate source of current for supplying each of said rotors and associated fields, and a relay in series with each of said fields and its associated source of current, said relays serving to make and break the circuit connecting one of said rotors with its associated source of current.

5. In a motor control system, a motor comprising two electrically independent rotors mechanically connected, electrically independent fields cooperating with each of said rotors, a separate source of current for supplying each of said rotors and associated fields, and a relay in series with each of said fields and its associated source of current, said relays being adapted to be energized and deenergized alternately and serving to make and break the circuit connecting one of said rotors with its associated source of current.

In witness whereof, I have hereunto set my hand this 19 day of Oct., 1922.

ALFRED F. WELCH.